United States Patent
Sawada et al.

(10) Patent No.: US 6,239,528 B1
(45) Date of Patent: May 29, 2001

(54) METHOD FOR COILING A WIRE AROUND A STATOR CORE

(75) Inventors: Kiyoshi Sawada, Shizuoka; Tomohiko Kawai, Yamanashi; Masaki Suzuki, Tokyo, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/456,544

(22) Filed: Dec. 8, 1999

Related U.S. Application Data

(62) Division of application No. 09/326,618, filed on Jun. 7, 1999.

(30) Foreign Application Priority Data

Jun. 9, 1998 (JP) .................................................. 10-175342

(51) Int. Cl.$^7$ .................................................. H02K 1/00
(52) U.S. Cl. .................. 310/179; 310/254; 310/258; 310/259; 310/208; 310/216
(58) Field of Search .................. 310/254, 179, 310/184, 185, 194, 198, 208, 202, 203, 216, 218, 258, 259, 14, 23, 30, 34

(56) References Cited

U.S. PATENT DOCUMENTS

| | | | |
|---|---|---|---|
| 4,439,698 * | 3/1984 | Chen | 310/12 |
| 4,511,870 * | 4/1985 | Caillat | 335/312 |
| 4,547,713 * | 10/1985 | Langley et al. | 318/254 |
| 4,866,573 * | 9/1989 | Bernstein | 361/400 |
| 5,197,180 * | 3/1993 | Mihalko | 29/596 |
| 5,619,085 * | 4/1997 | Shramo | 310/184 |

FOREIGN PATENT DOCUMENTS

| | | |
|---|---|---|
| 5-161290 | 6/1993 | (JP) . |
| 6-159361 | 6/1994 | (JP) . |
| 6-205553 | 7/1994 | (JP) . |

* cited by examiner

*Primary Examiner*—Nestor Ramirez
*Assistant Examiner*—Thanh Lam
(74) *Attorney, Agent, or Firm*—Staas & Halsey LLP

(57) ABSTRACT

A winding of a motor is formed by coiling a wire around a slotless stator core with combination of troidal coiling and array coiling. The toroidal coiling is carried out in a manner such that the wire is coiled without any intersecting turns in one direction for the formation of the winding as it is coiled rotating spirally. By this coiling method, the accuracy of the position of the winding in the direction tangent to the surface of the stator core can be improved. The array coiling is carried out in a manner such that the winding is formed in layers that are stacked on one another. By this coiling method, the accuracy of the position of the winding in the direction normal to the surface of the stator core can be improved. Thus, the overall thickness of the winding can be made uniform.

7 Claims, 9 Drawing Sheets

METHOD FOR COILING A WIRE AROUND A STATOR CORE

This application is a divisional of application Ser. No. 09/326,618, filed Jun. 7, 1999, now pending.

BACKGROUND OF THE INVENTION

1. Field of the Invention

The present invention relates to a method for coiling a wire around a slotless stator core of a motor.

2. Description of the Prior Art

Components of various precision apparatuses, such as optical and electronic apparatuses, require working accuracy of the nanometer order to meet the requirement for the development of higher-accuracy, higher-density, and higher-integration versions. A very high resolution is expected of a machine tool, stepper,. electron-beam exposure system, etc. that are used to work these high-precision components. In general, these machining and manufacturing apparatuses are provided with a positioning device. In many cases, the position control of the positioning device is effected by means of a rotary servomotor or linear motor that is controlled by means of a CNC. In order to increase the working accuracy of the components, therefore, the rotary servomotor or linear motor must be controlled with high accuracy.

FIG. 10 is a schematic sectional view for illustrating a magnetic circuit of a conventional servomotor. In this servomotor, slots 24 are formed in a stator core 21, and a winding 23 formed of a coiled wire 22 is embedded in each slot 24, whereby a magnetic circuit is formed. In this magnetic circuit, lines 27 of magnetic force pass through tooth portions 26 between the slots 24. Thus, the lines 27 of magnetic force extend depending on the location and shape of the tooth portions 26, and are not influenced by the way of coiling the winding 23.

Usually, the rotary servomotor or linear motor is subject to torque ripples, which must be minimized in order to control the motor with high accuracy.

Torque ripples can be divided broadly into two categories; one based on structural condition and the other based on electromagnetic condition. In the case of the rotary servomotor, for example, frictional resistance produced in a bearing for the shaft of a rotor can be a torque ripple based on the structural condition. On the other hand, magnetostriction caused between the rotor and a stator can be a torque ripple based on the electromagnetic condition.

Conventionally, in order to restrain the occurrence of torque ripples based on the structural condition, a proposal is made to reduce frictional resistance by supporting the shaft in a noncontact manner by means of a pneumatic or magnetic bearing. Further, use of a slotless stator core is proposed to restrain the occurrence of torque ripples based on an electromagnetic condition.

In order to form a winding by coiling a wire around a stator core, in general, slots are formed in the stator core. The slots may produce cogging torque. In the case of the stator core having slots, electromagnetic action on the rotor depends on the slot shape, and is influenced little by the wire coiling mode. Accordingly, it is necessary only that the number of turns of the winding be equal to a set number, and the position and shape of the winding are not very important factors.

In the case of the motor that uses the slotless stator core, on the other hand, the positional accuracy and shape of the winding constitute essential factors that determine the electromagnetic action on the rotor.

FIG. 11 is a schematic sectional view for illustrating a magnetic circuit of a slotless motor, and FIG. 12 is a schematic sectional view for illustrating positional errors of a winding.

As shown in FIG. 11, a winding 33 is pasted on the inner surface of a ring-shaped stator core 31 of the slotless motor that is opposed to a rotor 35. The stator core 31 is formed having no slots or tooth portions. Since lines 37 of magnetic force are influenced by the location and the way of coiling of the winding 33, the positional accuracy of the winding 33 pasted on the stator core 31 constitutes a factor that determines the incidence of torque ripples.

As shown in FIG. 12, the positional errors of the winding include (a) misalignment between turns of the wire in each block of the winding, (b) an error in the pasting position for the wire in the circumferential direction of the stator core, and (c) an error in the pasting position for the wire in the radial direction of the stator core. In some cases, torque ripples attributable to the positional errors of the winding are greater than in the case of a motor having slots.

A method for coiling a wire around a slotless stator core has already been proposed. FIGS. 13 and 14 are views for illustrating this coiling method.

As shown in FIGS. 13 and 14, windings 52 in the form of a simple segment each are prepared in advance by coiling a wire like an array by means of a jig or the like. These segment-shaped windings 52 are pasted on a stator core 51 and then connected to one another through a connecting wire. By doing this, the positional accuracy of the windings during assembly can be improved.

According to this method for coiling the wire around the slotless stator core, however, the winding is pasted on only one side of the stator core, so that satisfactory strength cannot be obtained with ease. In the case where the entire structure is molded, therefore, the winding may come off as a molding agent undergoes cure shrinkage.

Since the segment-shaped windings overlap one another, moreover, they must have a complicated three-dimensional shape. More specifically, a first-phase winding segment 52 (e.g., segment of U-phase winding), second-phase winding segment 54 (e.g., segment of V-phase winding), and third-phase winding segment 55 (e.g., segment of W-phase winding) overlap partially one another, and are pasted continuously on the stator core 51 in the circumferential direction. In order to fix the height of a straight portion (which serves as a magnet) of each segment in the normal direction, therefore, the winding segment 52 is formed having a bent portion 53.

The bent portion 53 is a portion in which the coating of the wire can be broken most easily, and is situated corresponding to an edge portion of the stator core. Therefore, a short circuit between lines or line-to-ground fault easily occurs in this portion. Accordingly, the wire is subjected to a substantial bending stress, so that its coating may be broken, possibly causing a short circuit between lines or line-to-ground fault. Besides, it is hard to arrange the winding segments with high positional accuracy, due to positional errors attributable to differences in shape and size between the segments or errors in the normal direction caused by adhesive bonding.

As shown in FIG. 15, showing stator 30 moreover, winding lugs 58 protrude in the axial direction of a motor shaft 56 from the stator core 51. The lugs 58 have no electromagnetic effect on the rotor. If the number of turns increases, therefore, the motor size becomes larger, thus constituting a hindrance to miniaturization. In the example shown in FIG. 16, spot-faced grooves 59 are formed by cutting those portions of a housing 57 of a support member for the stator and the like which correspond to the lugs 58, individually. If the motor is reduced in size in this manner, its mechanical rigidity lowers inevitably.

OBJECTS AND SUMMARY OF THE INVENTION

The object of the present invention is to provide a method for coiling a wire around a slotless stator core with high positional accuracy, thereby forming a winding capable of generating a uniform magnetic field.

In an aspect of the present invention, there is provided a method in which a winding is formed by toroidally coiling a wire like an array around a slotless stator core, whereby a stator of a rotary or linear motor is formed.

In the following explanation, "toroidal coiling" means a coiling method carried out in a manner such that wire is coiled without any intersecting turns in one direction for the formation of the winding as it is coiled rotating spirally. By using this coiling method, the accuracy of the position of the winding in the direction tangent to the surface of the stator core can be improved.

Further, "array coiling" means a coiling method carried out in a manner such that winding is formed in layers that are stacked on one another. By using this coiling method, the accuracy of the position of the winding in the direction normal to the surface of the stator core can be improved. By improving the positional accuracy of the winding in the normal direction, the overall thickness of the winding can be made uniform.

Thus, the positional accuracy of the winding can be improved for both the directions tangent and normal to the surface of the stator core by coiling with combination of troidal coiling and array coiling. As the winding is formed with high positional accuracy for both these directions, the electric resistance and inductance of the winding can be made uniform, so that a uniform magnetic field can be formed.

In troidal coiling, if wire is coiled in layers at given pitches, the positional accuracy of the winding can be improved for both the directions tangent and normal to the surface of the stator core. By doing this, a uniform magnetic field can be formed.

In case of troidal coiling, no intersecting turns are formed in wire within each layer in one direction for the formation of the winding. If the coiling operation is repeated so that the next layer is coiled, however, intersecting turns are formed in wire between the adjacent layers. Those intersecting turns are situated on that side of a magnetic field generated by the stator which influences the rotation of a rotor less. Depending on the location of the intersecting turns, the influence of the unevenness of the magnetic field generated therein on torque ripples can be lessened. For example, the intersecting turns may be located on an end face of the stator in the axial direction thereof or on the outer peripheral surface of the stator on the side remoter from the rotor.

In the case where wire is toroidally coiled around a ringshaped stator core, gaps are formed between wire turns on the outer-diameter side due to the difference between the inner and outer diameters of the stator core. Normally, however, the rotor is situated on the inner-diameter side of the stator. If the magnetic field is made uneven by the gaps between the wire turns on the outer-diameter side, therefore, the rotation of the rotor cannot be influenced thereby.

According to the invention, moreover, wire for the winding has a flat rectangular cross section, and is coiled so that the adjacent sides of the respective rectangular cross sections of the adjacent wire turns extend parallel to one another. If wire is a round wire having a circular cross section, the wire turns at the return end portions of the winding are inevitably stacked in an offset manner even in the case of array coiling, so that the magnetic field may become uneven. If wire according to the invention has a flat rectangular cross section, it can be coiled so that the adjacent sides of the respective rectangular cross sections of the adjacent wire turns extend parallel to one another, with the result that a uniform magnetic field can be formed even at the return end portions of the winding.

Further, enlargement of the size of the entire winding can be restrained by suitably settling the ratio between the respective lengths of the long and short sides of the rectangular cross section of the wire.

In another aspect of the invention, there is provided a coiling method for forming windings, in which the windings for individual phases, the number of which depend on the number of poles, are connected electrically to one another by means of wiring on a printed board that is provided on an end face of the stator core.

According to the invention, moreover, there is provided a coiling method for forming windings, in which a printed board is pasted on one end face or each of the two opposite end faces of the stator core, and the wire is coiled together with the printed board around the stator core.

In the case where a multipolar motor is designed to be driven in different phases, a plurality of windings are formed on its stator, corresponding to the number of poles of the motor and the number of phases. In the case of the stator of an eight-pole three-phase AC servomotor, for example, unit windings formed by combination of troidal coiling and array coiling, hereinafter referred to as segment, are arranged individually in 24(=8×3) positions within an angular range of 15° on a slotless stator core. In arranging the segments, each two adjacent segments are coiled in opposite directions, and each three segments are of the same phase.

The segments are connected by means of the printed board that is pasted on one end face or each of the two opposite end faces of the stator core. Further, the wire is coiled around the stator core and the printed board in a lump. This arrangement facilitates the connection of the segments. Furthermore, the projection of lugs of the windings is lessened, so that the motor can be reduced in size. Since the wire fixes the stator core and the printed board in one united body, moreover, the resulting structure is less liable to separation or dislocation of the wire. Since each edge portion of the stator core is covered by the printed board, furthermore, the bending stress on the wire and exfoliation of the insulating coating can be restrained. The function of the printed board can be improved by rounding the profile of the edge portion of the board.

A stator of a motor to which the above-described method is applied comprises a ring-shaped slotless stator core having a rectangular cross section and a plurality of winding segments formed by coiling a wire around the stator core, the number of the segments depending on the number of poles of the motor and the number of phases of an AC power source. Each of the winding segments includes at least a first winding layer, formed by spirally coiling the wire in a first direction on the stator core lest any portion of the wire intersect any other wire portion, and a second winding layer, formed by spirally coiling the wire in a second direction opposite to the first direction on the first winding layer lest any portion of the wire intersect any other wire portion, and a second winding layer, the second winding layer being stacked on the first winding layer. Moreover, the winding segments have the same number of turns and external shape and are arranged on the stator core at equal spaces in the circumferential direction.

Further, the wire that constitutes the winding segments has a circular or flat rectangular cross section.

Further, each of the winding segments is formed by coiling the wire around the stator core and a printed board pasted on at least one end face of the stator core.

Furthermore, the winding segments are connected to one another by means of a printed pattern on the printed board pasted on at least one end face of the stator core.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Referring now to the accompanying drawings of FIGS. 1 to 9, there will be described a case in which a coiling method of the present invention is applied to a stator 1 of a three-phase AC servomotor.

Figure 1:
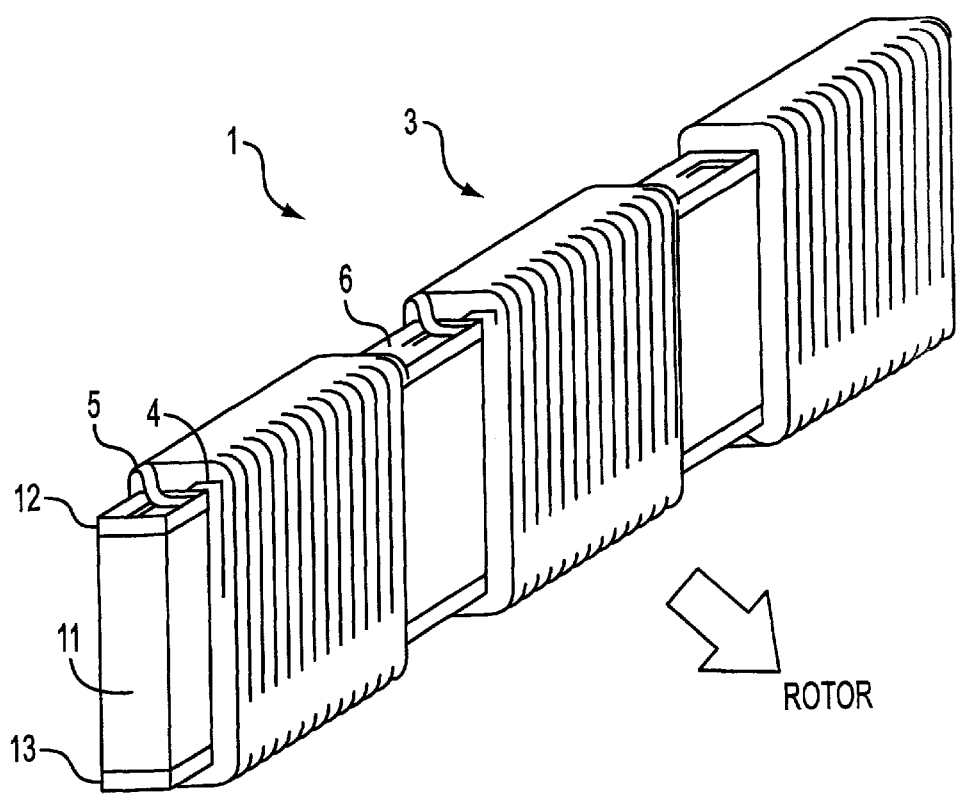
FIG. 1 is a perspective view taken from the side of a rotor, showing a winding formed by a wire coiling method according to the invention applied to a stator of a three-phase AC servomotor.

Printed boards 12 and 13 are put intimately on the opposite end faces (upper and lower end faces in FIG. 1), individually, of a stator core 11 in the axial direction of a motor shaft. A wire 2 having a first end 4 and a second end 5, is coiled around the printed boards 12 and 13 and the stator core 11 so as to enclose them integrally. This way of wire coiling is combination of toroidal coiling and array coiling to form a winding segment 3. FIG. 1 illustrates three winding segments 3 with a gap 6 between the segments.

Figure 2:
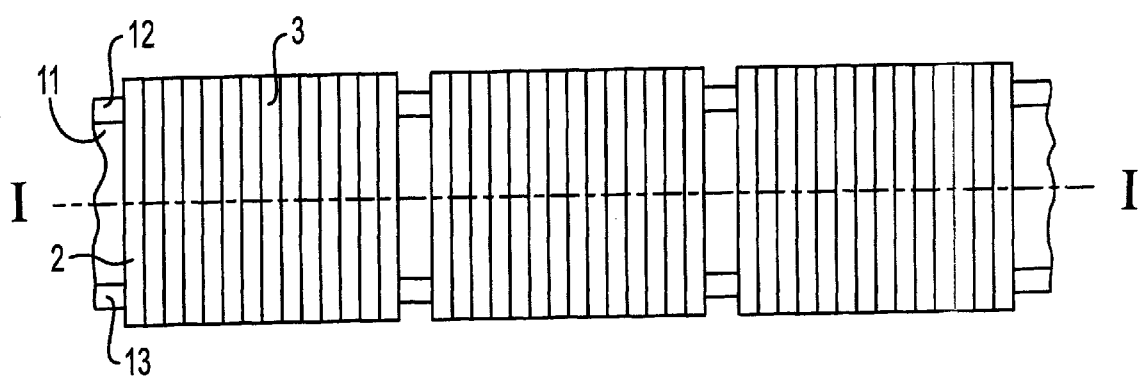
FIG. 2 is a plan view of the stator of FIG. 1 taken from the rotor side.

In toroidally coiling the wire 2 around the stator core 11 and the printed boards 12 and 13, the wire 2 is turned spirally in the longitudinal direction (direction I—I of FIG. 2) of the stator core 11. For each layer of a winding to be formed by the coiling operation, the wire 2 is toroidally coiled without any intersection produced, as shown in FIG. 2.

After the wire 2 is coiled for one layer in the longitudinal direction of the stator core 11 around the core 11 and the printed boards 12 and 13, it is turned back at an end portion and coiled superposed on the layer (first layer) that is formed in the previous cycle of coiling operation. For the next layer (second layer), the wire 2 is coiled toroidally as in the case of the first layer.

By this operation, the winding is formed in layers, and the individual layers are stacked for array coiling.

Figure 3:
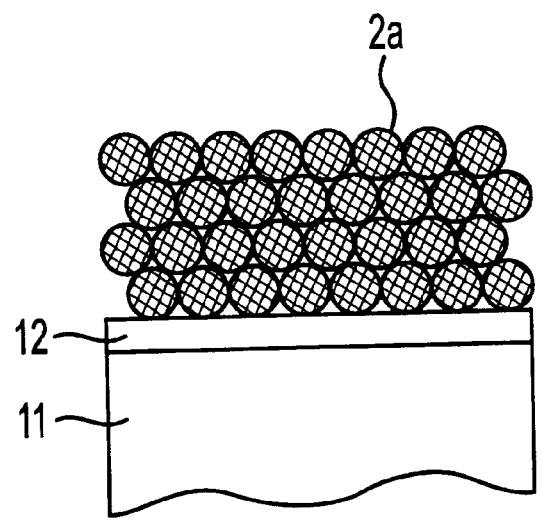
FIG. 3 is a sectional view taken along line I—I of FIG. 2, showing a wire having a circular cross section.
Figure 4:
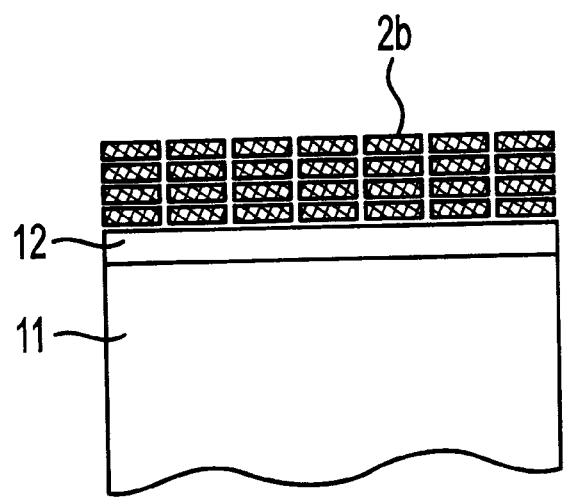
FIG. 4 is a sectional view taken along line I—I of FIG. 2, showing a wire having a flat rectangular cross section.
Figure 5:
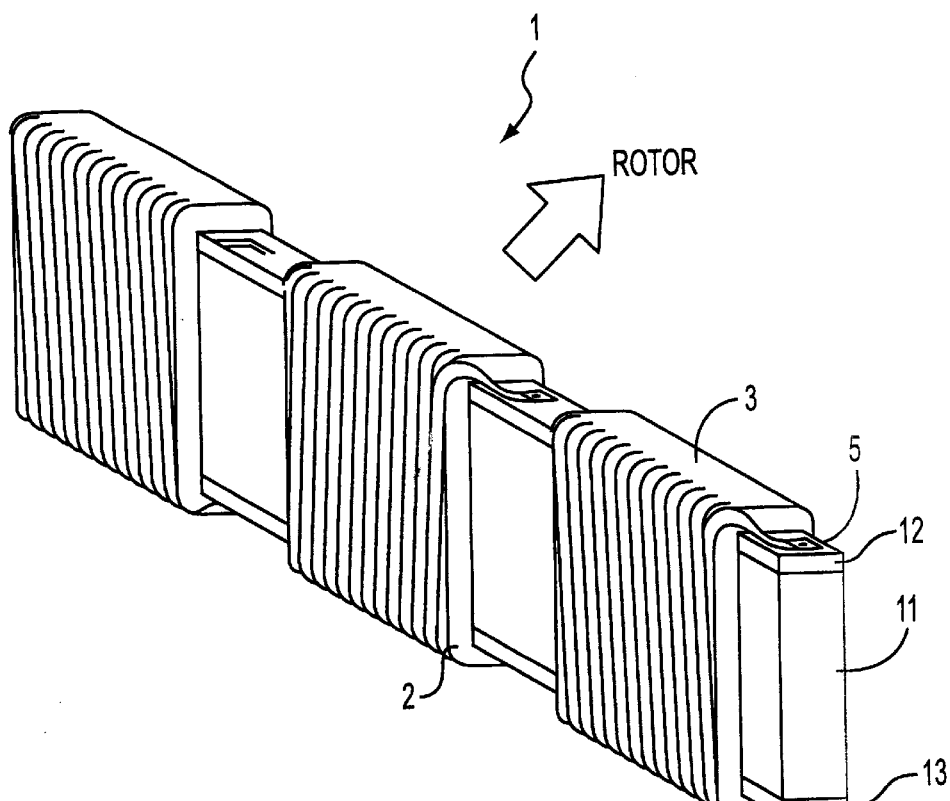
FIG. 5 is a perspective view taken from the side remoter from the rotor, showing a winding formed by the wire coiling method of the invention applied to a stator of a three-phase AC servomotor.

FIGS. 3 and 4 are views for illustrating this array coiling. FIG. 3 shows the case of a wire having a circular cross section, while FIG. 4 shows the case of a wire having a flat rectangular cross section.

As shown in FIG. 3, a wire 2a is toroidally coiled for each of layers, and the individual layers are stacked by array coiling. One circular cross section of the wire 2a in each layer is located over the boundary between the respective circular cross sections of two adjacent turns of the wire 2a in each underlying layer.

As shown in FIG. 4, on the other hand, a wire 2b is toroidally coiled for each of layers, and the individual layers are stacked by array coiling. One rectangular cross section of the wire 2b in each layer is put directly on the rectangular cross section of the wire 2b in each directly underlying layer. If the wire 2b is coiled so that the short side of the rectangular cross section of each turn of the wire 2b is parallel to that of its adjacent turn in each layer, as shown in FIG. 4, the respective end portions of turned edges of the wire 2b in each layer are trued up, so that a uniform magnetic field can be formed.

Further, enlargement of the size of the entire winding can be restrained by suitably settling the ratio between the respective lengths of the long and short sides of the rectangular cross section of the wire 2b. For example, the overall thickness of the motor in the radial direction from the axis of the motor shaft can be reduced by stacking the rectangular wire 2b in layers so that the short side of each rectangular cross section is in line with the radial direction.

When the wire advances in one direction as any one layer is coiled toroidally, each two adjacent turns of the wire never intersect each other, as mentioned before. When the next layer starts to be coiled after coiling the first layer is finished, however, some turns of the two layers intersect one another. Those intersecting turns are situated on that side of a magnetic field generated by the stator which influences the rotation of a rotor less, that is, on the side remoter from the rotor in the example shown in FIG. 5. Alternatively, the intersecting turns may be situated on the endface side of the stator in the axial direction of the motor shaft.

Figure 6:
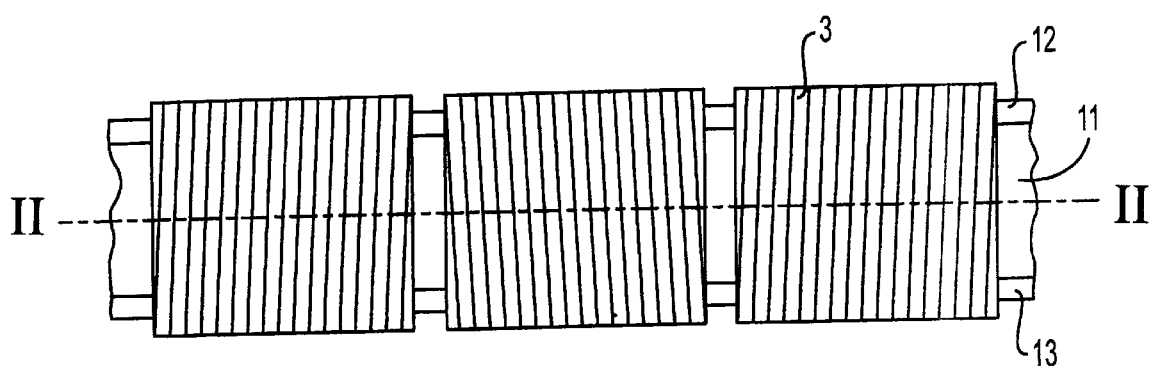
FIG. 6 is a plan view of the stator of FIG. 5 taken from the rotor side.

FIG. 6 is a view of the stator taken from the rotor side, showing the intersecting turns between the adjacent layers.

As seen from FIG. 6, the angle of inclination of the winding to the longitudinal direction of the stator core (direction II—II of FIG. 6) varies between the layers. The wire can be coiled in this manner by array coiling shown in the sectional view of FIG. 7 or 8.

Figure 7:
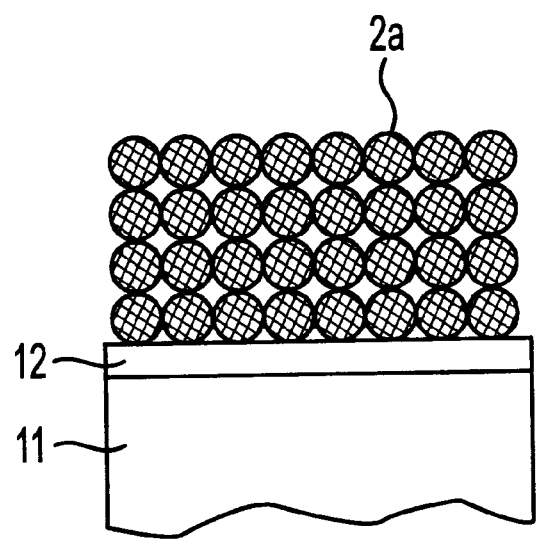
FIG. 7 is a sectional view taken along line II—II of FIG. 6, showing a wire having a circular cross section.
Figure 8:
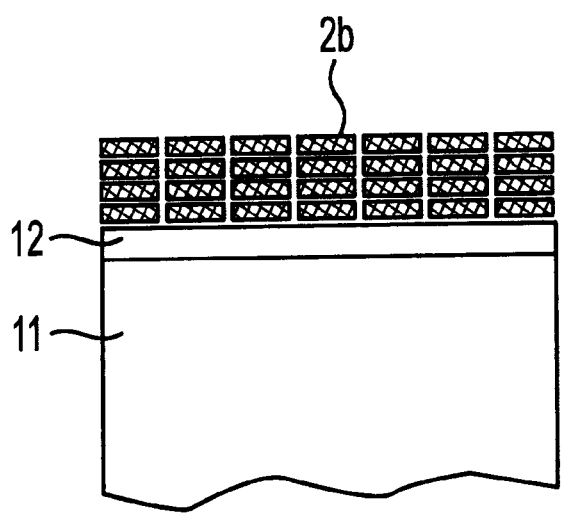
FIG. 8 is a sectional view taken along line II—II of FIG. 6, showing a wire having a flat rectangular cross section.

As shown in FIG. 7 or 8, a wire 2a or 2b is toroidally coiled for each layer, and the individual layers are stacked by array coiling. A circular or rectangular cross section of the wire 2a or 2b in each layer is put directly on the circular or rectangular cross section of the wire 2a or 2b in each directly underlying layer.

Figure 9:
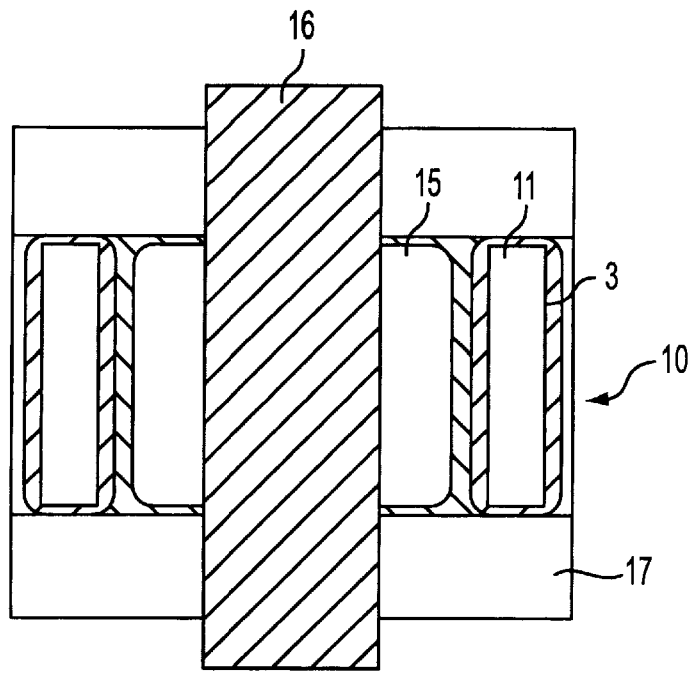
FIG. 9 is a sectional view of the three-phase AC servomotor using the stator shown in FIG. 1 or 5.
Figure 10:
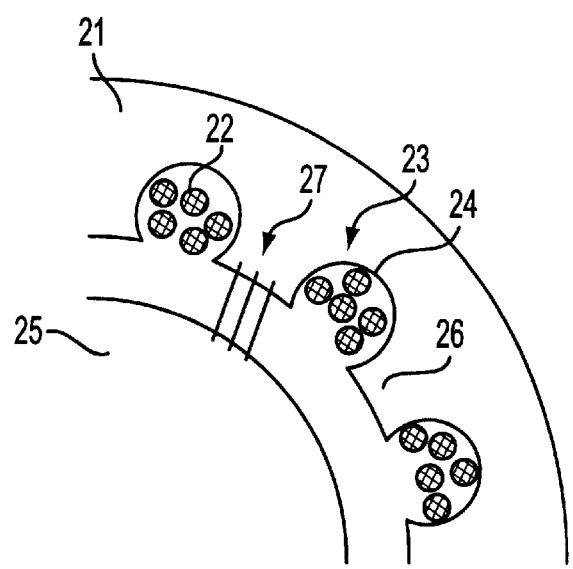
FIG. 10 is a schematic sectional view for illustrating a magnetic circuit of a conventional servomotor.
Figure 11:
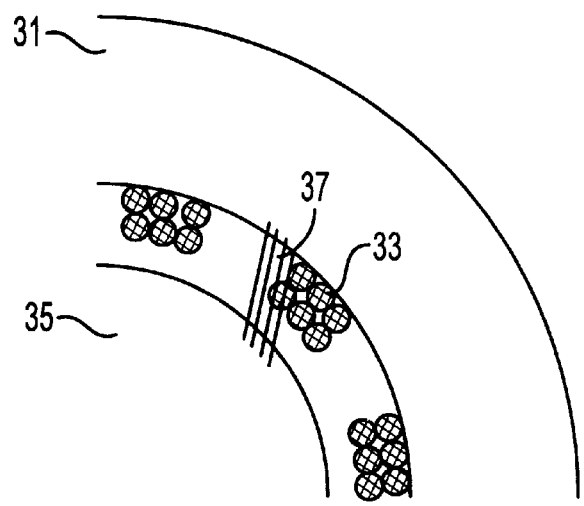
FIG. 11 is a schematic sectional view for illustrating a magnetic circuit of a conventional slotless motor.
Figure 12:
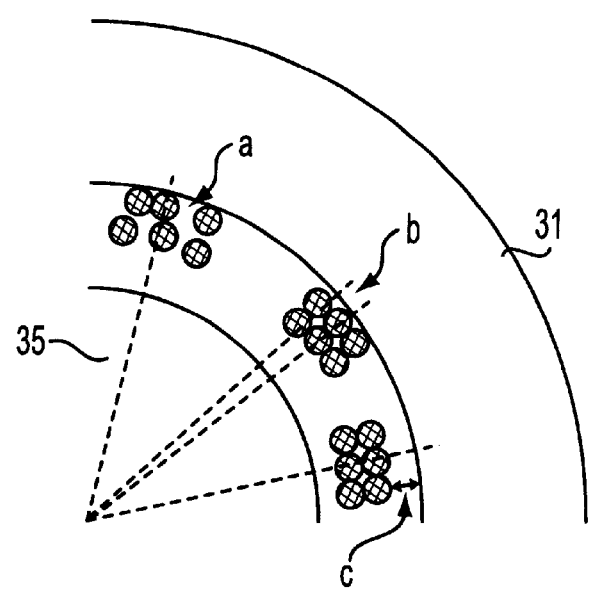
FIG. 12 is a view for illustrating positional errors of a winding.
Figure 13:
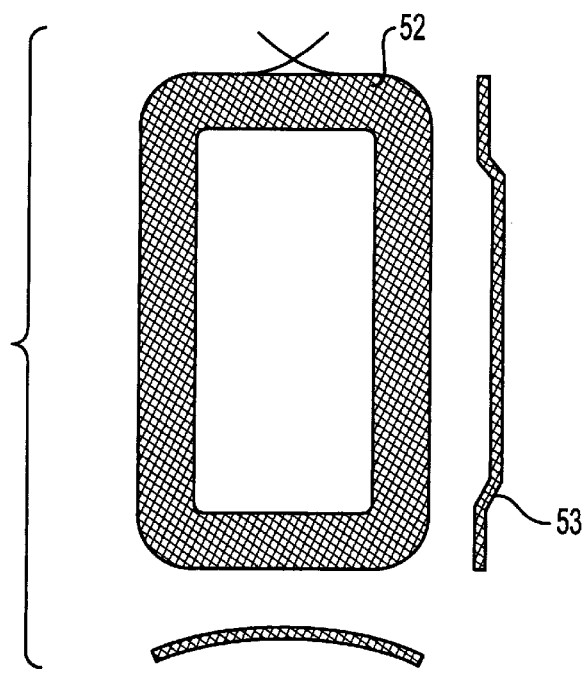
FIG. 13 is a view for illustrating a prior art example formed by coiling a wire around a slotless stator core.
Figure 14:
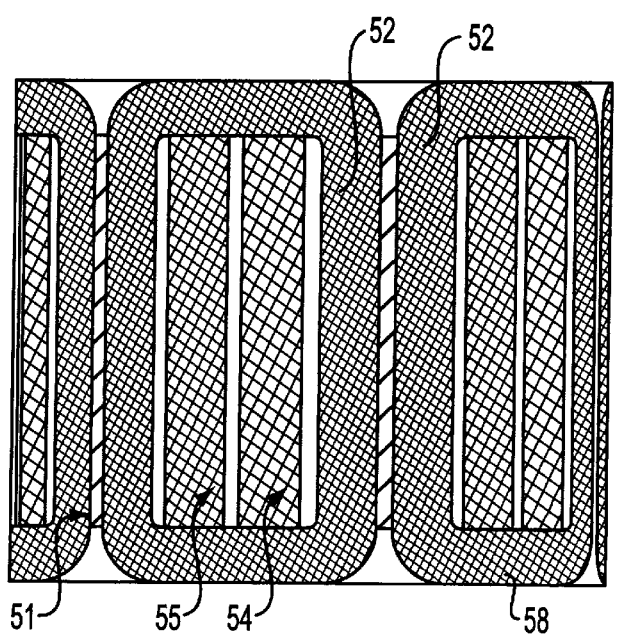
FIG. 14 is a view for illustrating the way the wire of FIG. 13 is attached to a slotless stator core for a three-phase motor.
Figure 15:
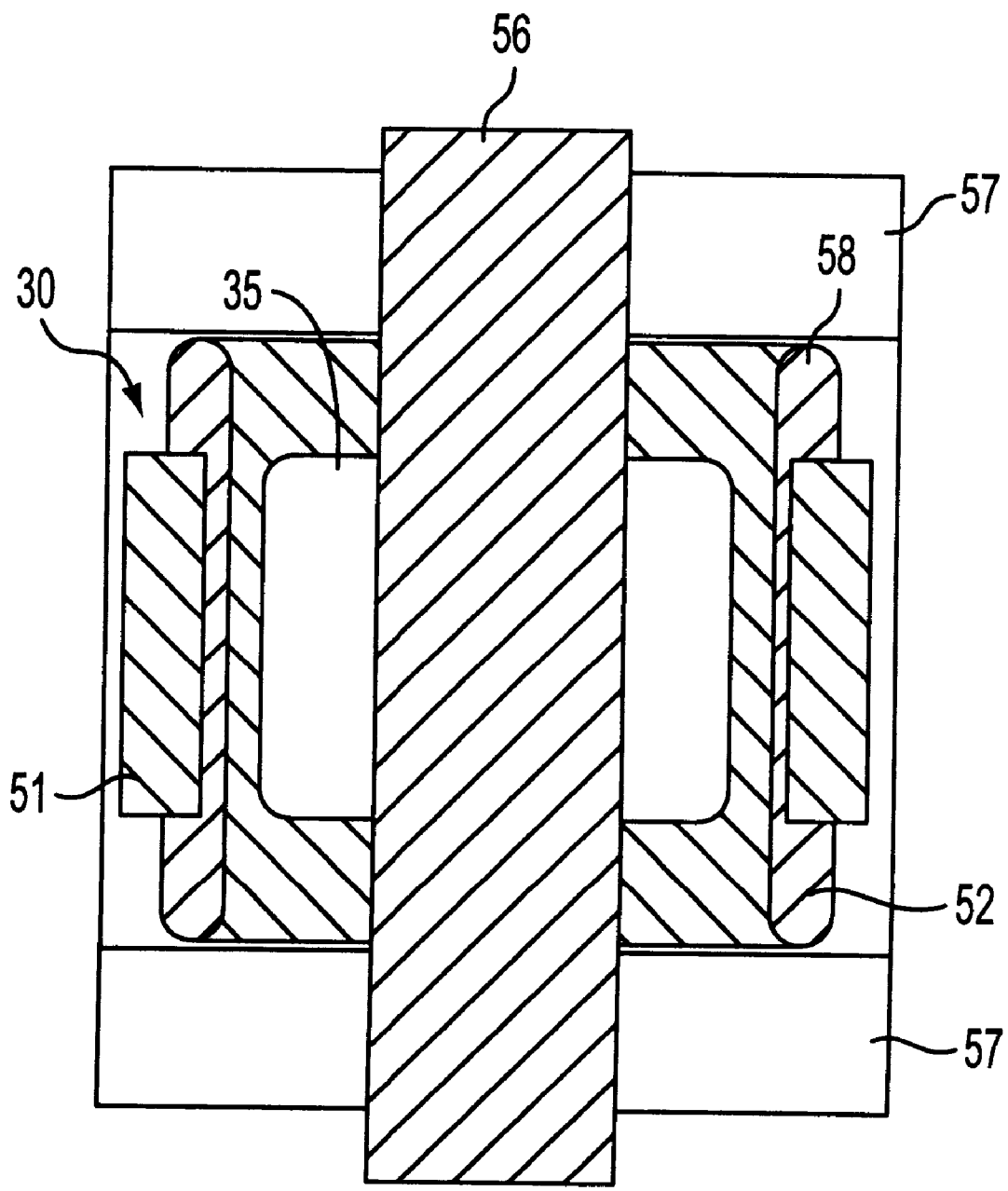
FIG. 15 is a sectional view of the three-phase motor using the slotless stator core of FIG. 14.
Figure 16:
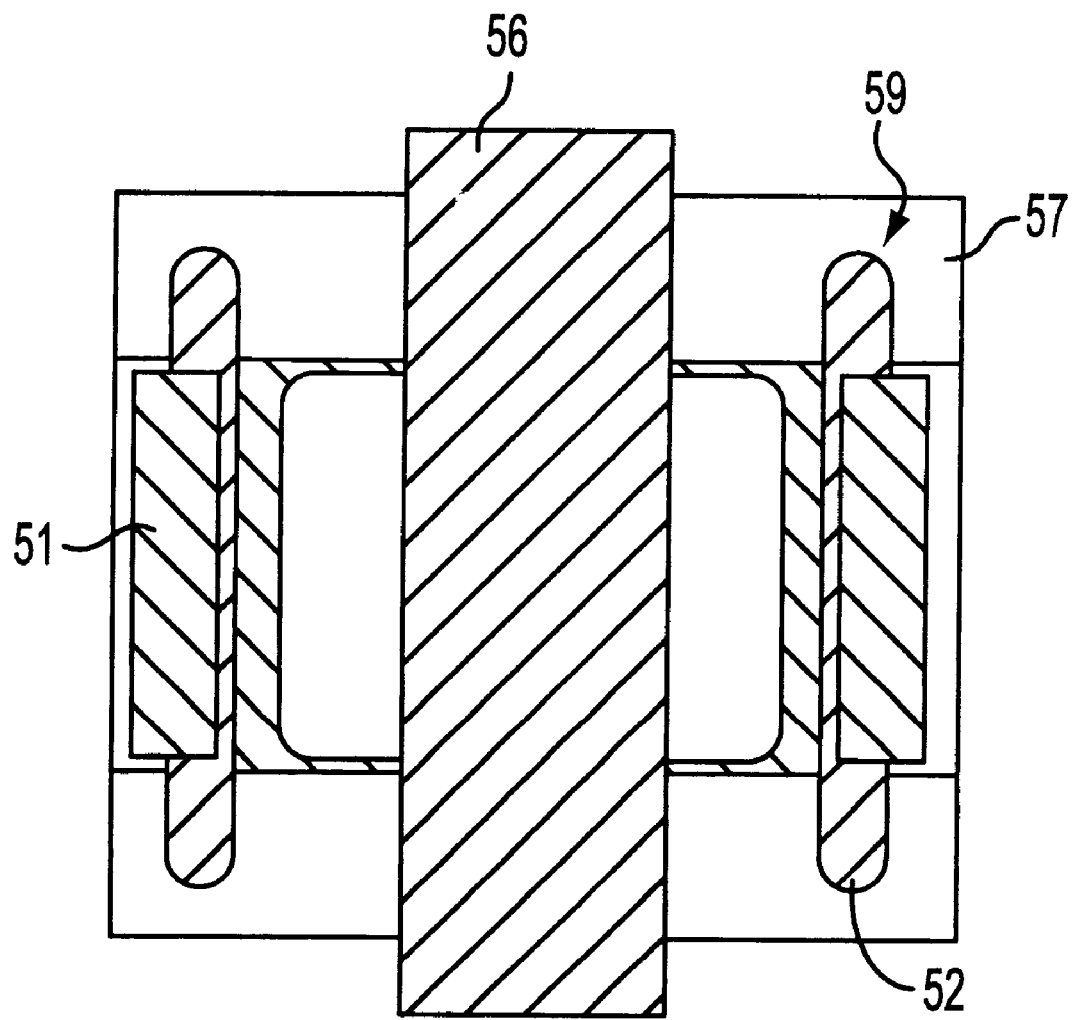
FIG. 16 is a view showing spot-faced grooves formed in a housing and individually storing lugs of a winding.

As shown in FIG. 9, the rotor 15 is rotated by means of electromagnetic force that is generated between lines of magnetic force therefrom and current that flows through the toroidal coil. The lines of magnetic force that are generated by a magnet in a rotor core cross the toroidal coil on the rotor side, pass through the stator core, cross the toroidal coil again, and return to the rotor, thereby forming a magnetic circuit. When current flows through the toroidal coil that are crossed by the lines of magnetic force, electromagnetic force is produced, so that the stator is subjected to force. Since the stator is fixed, the rotor is rotated by means of a reaction force to counter this force.

According to the coiling method of the present invention described above, lugs that are formed on conventional windings need not be formed, so that the axial length of the motor shaft 16 can be restricted, thus ensuring miniaturization. As shown in FIG. 9, moreover, a winding segment 3 can be stored in a motor 10 without forming a spot-faced groove in a housing 17.

Although the case of a rotary servomotor 10 has been described in connection with foregoing embodiment, the present invention may be also applied to a linear motor.

According to the present invention, as described herein, there may be provided a winding of a slotless stator core capable of generating a uniform magnetic field and a wire coiling method for the winding. Further, there may be provided a winding of a slotless stator core arranged with high positional accuracy and a wire coiling method for the winding. Furthermore, there may be provided a winding of a slotless stator core having less projection from the stator core in the axial direction of a motor and a wire coiling method for the winding.

What is claimed is:

1. A stator of a motor, comprising:
a ring-shaped slotless stator core having a rectangular cross section; and
a plurality of winding segments formed by coiling a wire around the stator core, the number of the segments depending on the number of poles of the motor and the number of phases of an AC power source, wherein
each said winding segment comprises at least a first winding layer, formed by spirally coiling the wire in a first direction on the stator core such that no portion of the wire intersects any other wire portion, and a second winding layer, formed by spirally coiling the wire in a second direction opposite to the first direction on the first winding layer such that no portion of the wire intersects any other wire portion, the second winding layer being stacked on the first winding layer, said winding segments having the same number of turns and external shape and being arranged on the stator core at equal spaces in the circumferential direction, and
wherein each said winding segment is formed by coiling the wire around the stator core and a printed board pasted on at least one end face of the stator core.

2. The stator of a motor according to claim 1, wherein said wire constituting the winding segments has a circular cross section.

3. The stator of a motor according to claim 1, wherein said wire constituting the winding segments has a flat rectangular cross section.

4. The stator of a motor according to claim 1, wherein said winding segments are connected to one another by means of a printed pattern on the printed board pasted on at least one end face of the stator core.

5. A stator of a motor, comprising:
a slotless stator core to be positioned in a motor;
a first layer of wire coiled around the slotless stator core such that as the wire advances in a first direction no portion of the coiled wire intersects any other wire portion previously coiled;
a second layer of the wire coiled around the first layer such that as the wire advances in a second direction opposite to the first direction, no portion of the second layer of coiled wire intersects any other previously coiled wire portion of the second layer, and
an electrically conductive medium positioned on an end face of the slotless stator core prior to the first layer of wire being coiled around the slotless stator.

6. A stator for improving a uniform magnetic field in a motor having a slotless stator core, comprising:
a plurality of wire layers coiled around said slotless stator core; said plurality of wire layers comprising;
a first layer of wire toroidially coiled around said slotless stator core in a first direction along a longitudinal axis of the slotless stator core;
a second layer of wire toroidially coiled around said slotless stator core in a second direction opposite said first direction, along said longitudinal axis of said slotless stator core, said first and second layers being positioned relative to one another so as to reduce magnetic field non-uniformity effects; and
an electrically conductive medium positioned on an end face of the slotless stator core prior to toroidially coiling the wire around the slotless stator core in the first direction along the longitudinal axis of the slotless stator core.

7. A stator of a motor, comprising:
a slotless stator core to be positioned in a motor;
a first layer of wire coiled around the slotless stator core in a first direction; and
a second layer of wire coiled around the first layer in a second direction opposite to the first direction; and
an electrically conductive medium positioned on an end face of the slotless stator core prior to coiling the first layer of wire around the slotless stator core in the first direction.

* * * * *